(12) United States Patent
Necci et al.

(10) Patent No.: US 10,000,278 B2
(45) Date of Patent: Jun. 19, 2018

(54) LANDING GEAR FOR AN AIRCRAFT COMPRISING AN OBSTACLE DETECTOR

(71) Applicants: Safran Electronics & Defense, Boulogne-Billancourt (FR); SAFRAN LANDING SYSTEMS, Velizy Villacoublay (FR)

(72) Inventors: Carlo Necci, Velizy Villacoublay (FR); Jacques Lacourie, Boulogne-Billancourt (FR)

(73) Assignees: SAFRAN ELECTRONICS AND DEFENSE, Boulogne-Billancourt (FR); SAFRAN LANDING SYSTEMS, Velizy Villacoublay (FR)

( * ) Notice: Subject to any disclaimer, the term of this patent is extended or adjusted under 35 U.S.C. 154(b) by 122 days.

(21) Appl. No.: 15/304,475

(22) PCT Filed: Apr. 17, 2015

(86) PCT No.: PCT/EP2015/058386
§ 371 (c)(1),
(2) Date: Oct. 14, 2016

(87) PCT Pub. No.: WO2015/158894
PCT Pub. Date: Oct. 22, 2015

(65) Prior Publication Data
US 2017/0036756 A1  Feb. 9, 2017

(30) Foreign Application Priority Data
Apr. 17, 2014 (FR) .................................. 14 53517

(51) Int. Cl.
*B64C 25/10* (2006.01)
*B64C 25/08* (2006.01)
(Continued)

(52) U.S. Cl.
CPC ............ *B64C 25/08* (2013.01); *B64C 25/001* (2013.01); *B64D 47/08* (2013.01)

(58) Field of Classification Search
CPC ...................................................... B64D 47/08
See application file for complete search history.

(56) References Cited

U.S. PATENT DOCUMENTS 8,042,765 B1  10/2011  Nance
2003/0048357 A1  3/2003  Kain et al.

FOREIGN PATENT DOCUMENTS

EP        2708464 A1       3/2014
WO    WO-2010003911 A1    1/2010
WO    WO-2012131105 A1    10/2012

OTHER PUBLICATIONS

French Search Report with English Language Translation Cover Sheet, dated Jan. 8, 2015, FR Application No. 1453517.
(Continued)

*Primary Examiner* — Richard G Davis
(74) *Attorney, Agent, or Firm* — Womble Bond Dickinson (US) LLP (57) ABSTRACT

The invention relates to a landing gear (1) of an aircraft (5), comprising: a strut assembly (10) including a first end (10a) designed to be mounted on the aircraft (5) and a second end (10b) opposite the first end (10a); a rod (14) slidably mounted on the second end (10b) of the strut assembly (10), said rod (14) being translationally movable in relation to the strut assembly (10); and at least one obstacle detector (2) secured to the landing gear (1), the landing gear (1) being characterized in that the obstacle detector (2) is secured in a zone adjacent to the second end (10b) of the strut assembly (10).

16 Claims, 6 Drawing Sheets (51) Int. Cl.
*B64C 25/00* (2006.01)
*B64D 47/08* (2006.01)

(56) References Cited

OTHER PUBLICATIONS

International Search Report with English Language Translation, dated Jul. 28, 2015, PCT Application No. PCT/EP2015/058386.
Written Opinion of the International Search Authority with English Language Translation, dated Oct. 18, 2016, PCT Application No. PCT/EP2015/058386.

LANDING GEAR FOR AN AIRCRAFT COMPRISING AN OBSTACLE DETECTOR

FIELD OF THE INVENTION

The invention relates to the general field of detection of obstacles around an aircraft.

TECHNICAL BACKGROUND

These days, the main cause of accidents in an airport on traffic lanes and at boarding gates takes place during ground operations of aircraft. These accidents are generally due to collisions of the aircraft with obstacles present around it during its manoeuvres, in particular during backing manoeuvres. In fact, pilots have no visibility in areas located below and behind their aircraft.

The presence of such obstacles is dangerous for ground personnel, for the aircraft as well as for the passengers. Moreover, accidents resulting from the collision of an aircraft with obstacles have the consequence of reducing the operability of the airport, thus having an impact on the airport and the airline companies concerned.

In order to avoid collisions between an aircraft and obstacles present on the ground, it is known to escort the aircraft during its entire ground operation phase (towing, taxiing, etc.) with dedicated personnel. This personnel, especially trained for this type of assignment, guides the aircraft on the ground while anticipating the presence of obstacles. This guidance, however, the anticipation and the ability to identify possibly interfering obstacles on the runway, are limited by the fact that the personnel is human and can consequently make errors, be momentarily distracted or even have reduced visibility due to meteorological conditions. Moreover, a human being cannot physically view a field of view of 360° around the airplane.

In addition, this escorting work is dangerous, tiring and stressing for the ground personnel who, in addition to obstacles present on the ground, must anticipate the movement of vehicles and of other aircraft present on the ground.

SUMMARY OF THE INVENTION

One objective of the invention is therefore to propose a new means allowing detection of obstacles during ground operations of aircraft and to respond to the need for visibility rearward and below the aircraft, particularly during backing manoeuvres, which are more effective than conventional techniques, no matter the visibility conditions on the ground, and which in addition are automatic and independent of human reflexes.

To this end, the invention proposes a landing gear for an aircraft comprising:
- a casing, having a main direction extending along a longitudinal axis, said casing comprising a first end configured to be mounted on the aircraft, and a second end opposite to the first end,
- a rod, slidably mounted on the second end of the casing, said rod being movable in translation with respect to the casing along the longitudinal axis,
- at least one obstacle detector, attached to the landing gear in an area adjacent to the second end of the casing, Certain preferred but not limiting aspects of the landing gear described above are the following:
- the obstacle detector is attached to the casing,
- the landing gear further comprises a brace-strut, said brace-strut comprising a first end configured to be mounted on the aircraft, and a second end configured to be connected to the casing in an area adjacent to the second end of said casing, and wherein the obstacle detector is attached in an area adjacent to the brace-strut,
- the detector is attached to the casing, between the second end of the brace-strut and the first end of the casing,
- the obstacle detector is attached so as to be oriented toward a rear area of the landing gear, said rear area being intended to be oriented toward a rear area of an aircraft,
- the obstacle detector is attached in a lateral area of the landing gear, preferably in the internal portion of the landing gear,
- the landing gear comprises at least two obstacle detectors,
- the obstacle detectors are attached together so as to form a single part,
- the obstacle detector comprises at least one, preferably at least two obstacle detectors selected from the following group: infrared proximity detector, microwave proximity detector, ultrasonic proximity detector, one or more infrared or visible cameras, an ultrasonic range finder, a radar range finder or a laser range finder,
- the landing gear further comprises an actuator configured to rotate the obstacle detector around the longitudinal axis of the casing,
- the landing gear further comprises a wiring harness configured to control transmission of power within the landing gear, said wiring harness being attached to the landing gear using elastically deformable attachment rings, and wherein the obstacle detector comprises cables attached to the landing gear using the attachment rings of the wiring harness,
- the obstacle detector comprises a detection field having an aperture and a depth configured to cover a lower area of the aircraft and a rear area of the aircraft,
- the aperture of the detection field has a horizontal viewing angle comprised between 0° and 180°, and the depth of the detection field (F) is comprised between approximately 0 meter and 250 meters,
- the landing gear comprises a main landing gear or a nose landing gear of the aircraft, and
- the landing gear is retractable.

According to a second aspect, the invention also proposes an aircraft comprising a landing gear as described above.

BRIEF DESCRIPTION OF THE DRAWINGS

Other features, aims and advantages of the present invention will appear more clearly upon reading the detailed description that follows, with reference to the appended drawings given by way of non-limiting examples and wherein.

DETAILED DESCRIPTION OF ONE EMBODIMENT

In order to allow optimized obstacle detection and reduce the risks of collision of an aircraft 5 during operations on the ground, the invention proposes to equip the aircraft 5 with obstacle detectors 2 on its undercarriage 1 (or landing gear).

The physical structure of a landing gear 1 can in fact be used as a support for one or more obstacle detectors 2 on the aircraft 5. The obstacles thus detected by the detector(s) can then be used as input values for dedicated processing units, configured to analyze these input values and to deduce from them a safe and optimized trajectory during movement on the ground of the aircraft. If appropriate, the processing units are also configured to process information obtained by the obstacle detectors and to optimize them (for example, when the detector 2 comprises a video camera, the images obtained need to be processed in order to take into account the differences in lighting between shadow areas and areas exposed to light).

The landing gear 1 can also comprise a main landing gear 1 (for example located under the wings) or even an auxiliary landing gear 1 (such as a nose landing gear, located at the nose of the aircraft).

A landing gear 1 can be fixed or retractable into a dedicated landing gear 1 box formed in the fuselage or in the wings of the aircraft 5.

Hereafter, the invention will be described more particularly in the case of a retractable landing gear 1, i.e. a landing gear 1 capable of being retracted between the takeoff phase and the landing phase into a landing gear 1 box of an aircraft 5. This, however, is not limiting in that the invention applies without substantial modification to fixed landing gears 1, i.e. to non retractable landing gear 1 permanently attached to the structure of the aircraft 5.

Figure 1:
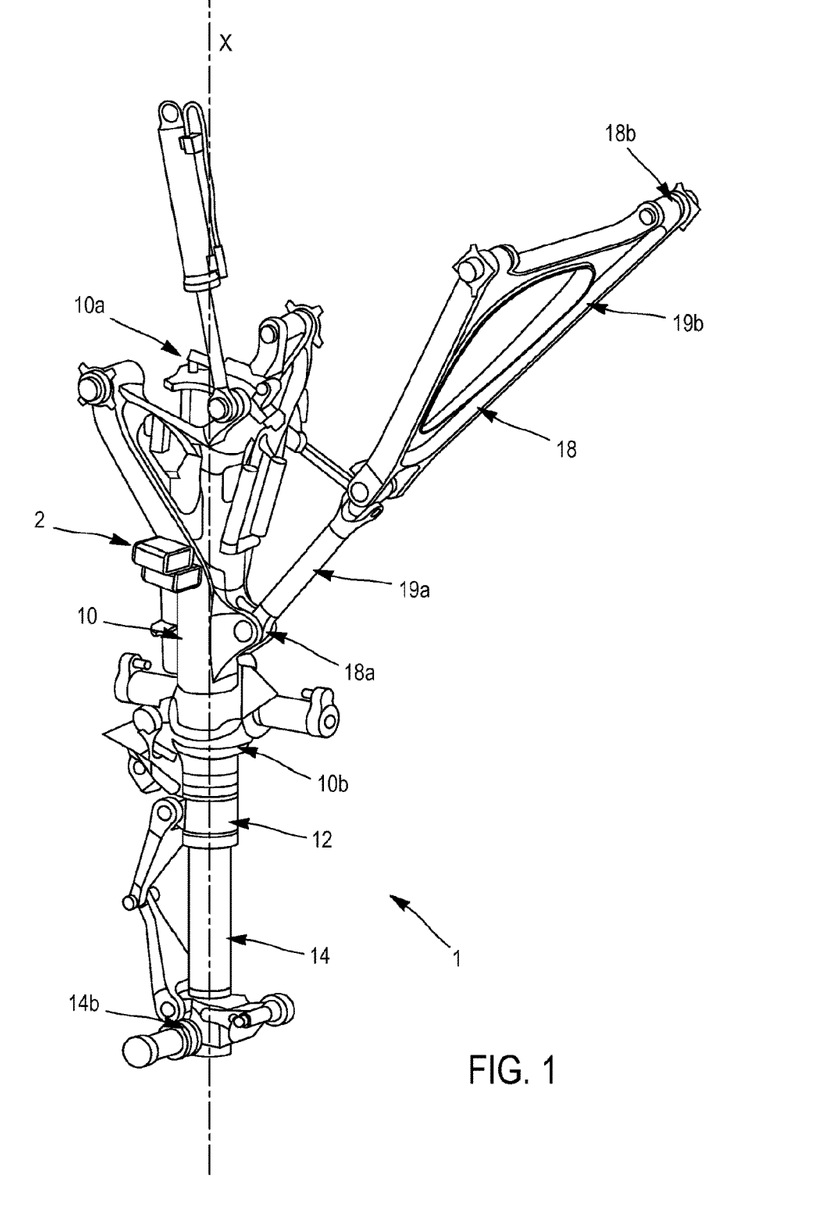
FIG. 1 is a perspective view of an exemplary embodiment of a nose landing gear conforming to the invention.
Figure 2A:
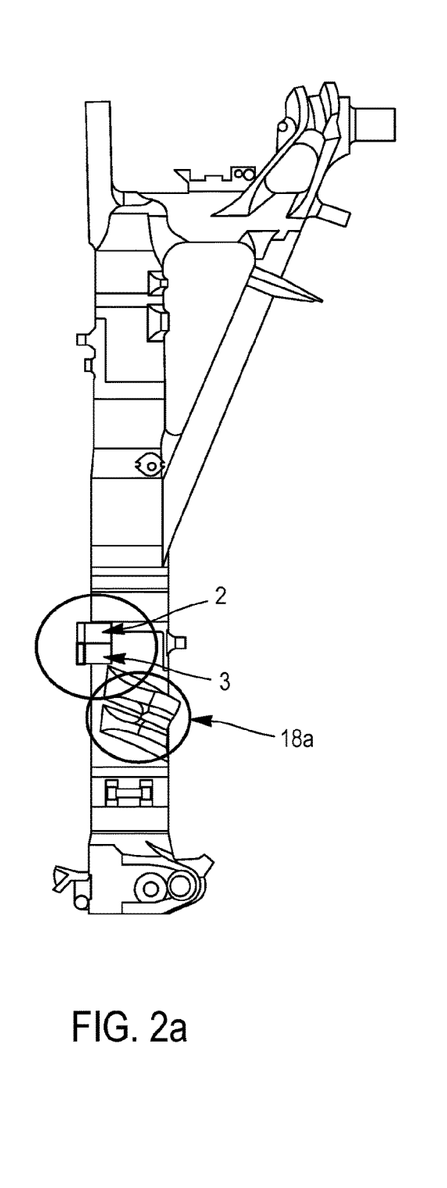
FIGS. 2a and 2b are side and rear views, respectively, of the casing and of a portion of the brace-strut of an exemplary embodiment of a main landing gear conforming to the invention.
Figure 2B:
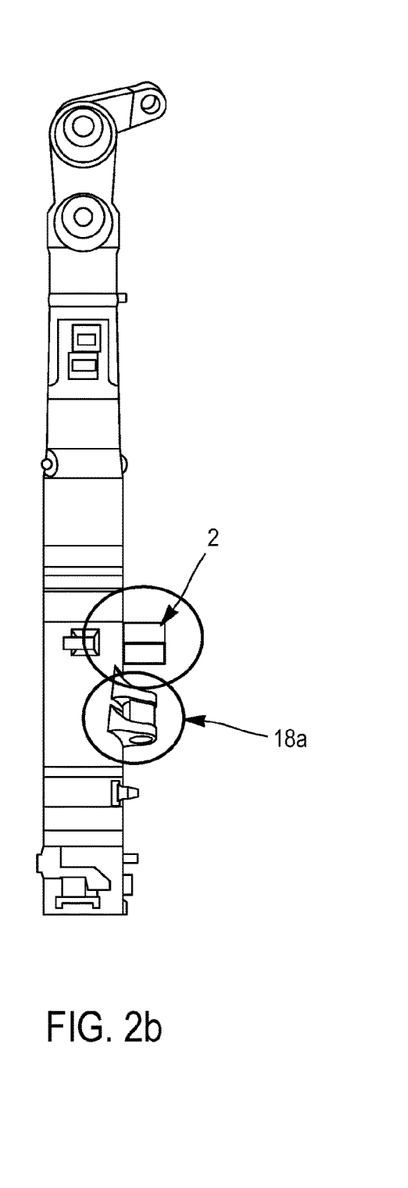

The landing gear 1 generally comprises, in a manner known per se, a casing 10, having a main direction extending along a longitudinal axis X, which constitutes the main body of the landing gear 1 and allows transmission of the main forces to the structure of the aircraft 5. The casing 10 comprises, to this end, a first end 10a, mounted on the structure of the aircraft 5, and a second end 10b, comprising a cavity that is not visible in which is pivotally mounted a lower portion consisting of a base 12 and a sliding rod 14.

The sliding rod 14 is movable in translation with respect to the casing 10 along the longitudinal axis X and forms, with the base 12, a damper adapted to absorb the energy of impact in landing and support the ground manoeuvres of the aircraft 5. The base 12 can be mounted in the cavity of the second end 10b of the casing 10 so that the sliding rod 14 can pivot substantially around the longitudinal axis X of the casing 10.

The end 14b of the sliding rod 14, which is farther from the second end 10b of the casing 10, supports displacement means 16, such as for example a wheel consisting of a rim.

The landing gear 1 further comprises a brace-strut 18, comprising a first end 18b configured to be mounted on the aircraft 5 and a second end 18a configured to be connected to the casing 10, in proximity to the second end 10b of said casing 10. The brace-strut 18 is configured to transmit to the structure of the aircraft 5 the axial loads coming from the displacement means 16.

Figure 3:
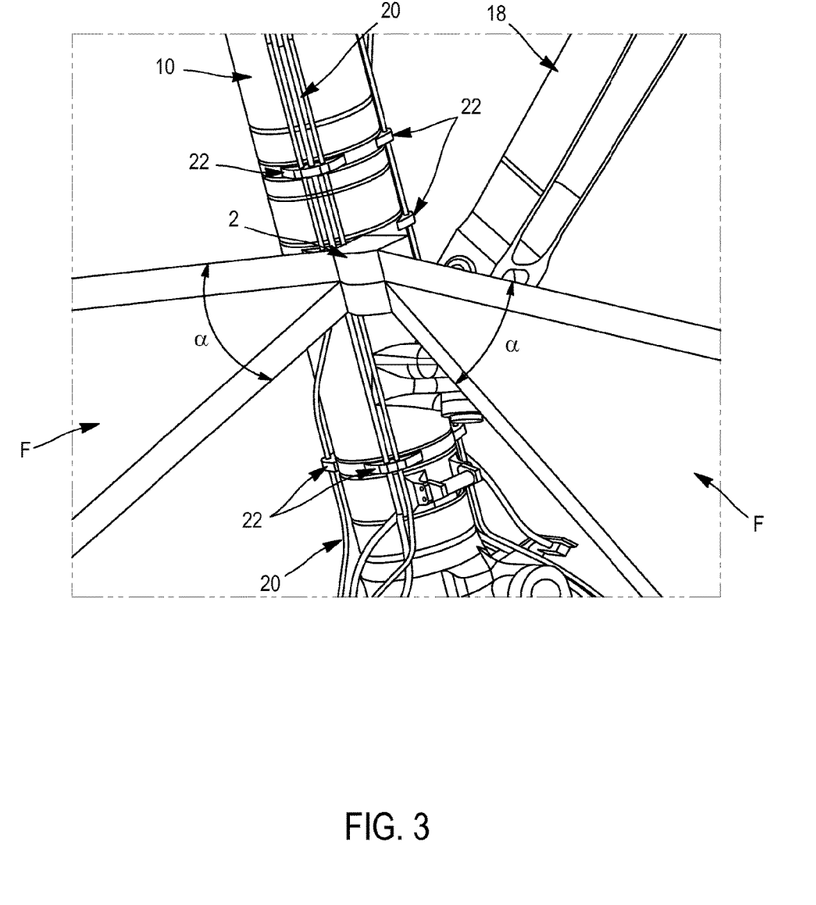
FIG. 3 is a partial view of the landing gear of FIG. 2, on which are visible attachment rings of the wiring harness of the landing gear.

The transmission of electrical power in the landing gear 1 is accomplished by means of a wiring harness 20 (electrical harness), which extends all along the landing gear 1, from the first end 10a of the casing 10 to the sliding rod 14. In a manner known per se, the wiring harness 20 can be pressed against the landing gear 1 using a series of elastically deformable attachment rings 22, distributed along the longitudinal axis X on the landing gear 1.

In the case of a retractable landing gear 1, as illustrated in the figures, the first end 10a of the casing 10 can be pivotally mounted around an axis fixedly linked to bearings integral with the structure of the aircraft 5, while the brace-strut 18 can be breakable, i.e. consisting of braced levers 19a, 19b which can be pivotally mounted to one another so as to allow the retraction of the landing gear 1.

The applicant became aware that it was technically difficult to accommodate sensors such as obstacle detectors 2 on the landing gear 1, in that the detection field F of these obstacle detectors 2 must cover at least the area extending below the aircraft 5 and the area extending to the rear of the aircraft 5 (in the direction of the tailplane and beyond). Optionally, it can also be useful for the obstacle detectors 2 to be capable of covering the forward area (toward the nose) of the aircraft 5, as well as the lateral areas.

Moreover, the performance of the obstacle detectors 2 must not be impacted by the speed of the aircraft 5 or meteorological conditions (rain, dust, snow and/or pollution).

It will also be noted that the position, the orientation and the selection of the obstacle detectors 2 must take into account the extent of the area that it is desired to monitor, the intrinsic detection field of the selected obstacle detector (aperture and depth of field), as well as the sensitivity of each detector (to lighting in particular, which is generally lower below the aircraft than around it, which can cause problems for some types of detectors).

These difficulties are further increased when the landing gear 1 is retractable. In fact, in the extended configuration of the landing gear 1, the obstacle detectors 2 must be oriented so as to be capable of detecting obstacles present under the aircraft 5 and behind it. In addition, in the retracted configuration, the obstacle detectors 2 must be able to be accommodated in the box of the aircraft 5, the volume whereof is sharply limited. Finally, it is necessary for the wiring harness 20 to follow the shape of the landing gear 1 and the kinematics of its actuating mechanism.

So as to meet all the requirements cited above, the obstacle detector 2 can for example be attached in an area adjacent to the second end 10b of the casing 10. The obstacle detector 2 then extends into a lower portion of the landing gear 1, at a distance from the structure of the aircraft 5, which makes it possible to obtain a large detection field F. In fact, by positioning the obstacle detector 2 in this manner, the detection field F of the detector 2 is not hindered by the doors of the landing gear 1 box or by the structure (fuselage or wing, depending on the position of the detector 2) of the aircraft 5. In addition, the obstacle detector 2 being at a distance from the ground, its detection field F is not limited by the presence of the ground and the risk that it may enter into collision with objects present on the ground or projected during movement of the aircraft 5 are strongly reduced. Finally, in the retracted configuration, the obstacle detector 2 does not risk being crushed between the retracted casing 10 and the attachment area of the casing 10 to the aircraft.

If appropriate, the obstacle detector 2 can be attached to a support 3, to a metal support for example. The detector 2 is then attached to the landing gear 1 through its support 3, for example, by means of conventional metal clamps.

In one embodiment, the obstacle detector 2 can be attached to the casing 10, in proximity to the brace-strut 18. For example, the obstacle detector 2 can be attached between the brace-strut 18 and the first end 10a of the casing 10, in proximity to the second end 10b of the casing 10. This configuration makes it possible in fact to easily accommodate the obstacle detector 2 in the box of the landing gear 1 without requiring any specific arrangement, while still guaranteeing an optimal detection field for the detection of obstacles on the ground.

Moreover, this configuration makes it possible to electrically connect the obstacle detector 2 to the wiring harness 20 of the landing gear 1 without substantially modifying the configuration of the wiring harness 20. To this end, the support 3 of the obstacle detector 2 can in particular be carried on the landing gear 1 and maintained in position in proximity to the attachment rings 22 already present on the wiring harness 20. Given that the attachment rings 22 are elastically deformable and that the connection cables of the obstacle detector 2 are small compared to the cables of the wiring harness 20 of the landing gear 1, it is then relatively easy to place the cables of the obstacle detector 2 under the attachment rings 22 and to hold them in position by means of said rings 22.

This method of attachment has the advantage of using attachment means already present on the landing gear 1 and to use little space. In addition, it allows any landing gear 1 already produced and without an obstacle detector 2 to be upgraded in a simple and rapid manner.

Figures 4A, 4B:
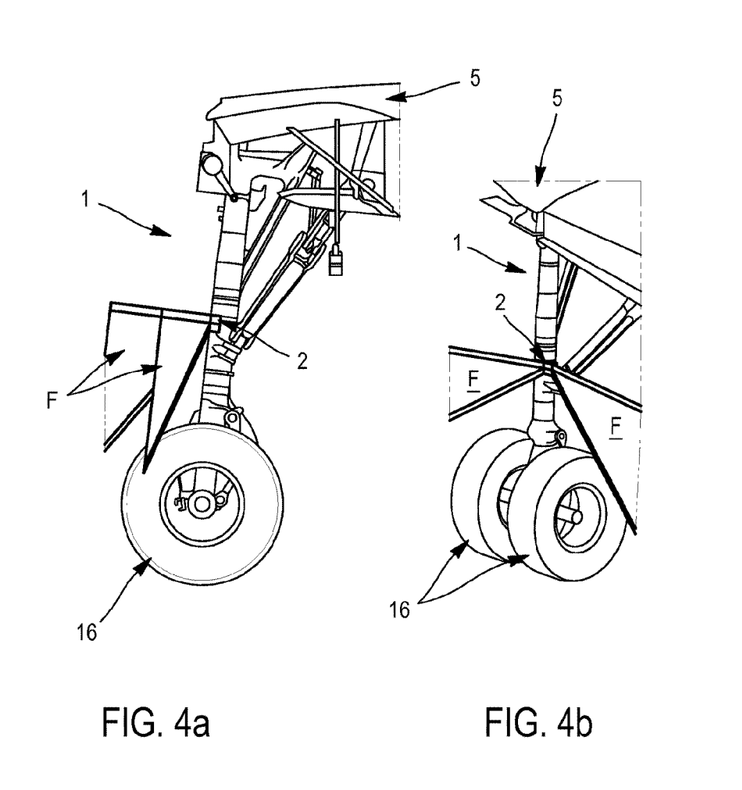
FIGS. 4a, 4b and 4c are respectively side, three-quarters and rear views of the detection field of the obstacle detector of the landing gear of FIG. 2, and FIGS. 5 and 6 illustrate examples of positioning of obstacle detectors on an exemplary embodiment of an aircraft comprising a nose landing gear and two main landing gear, and examples of associated detection fields.
Figure 4C:
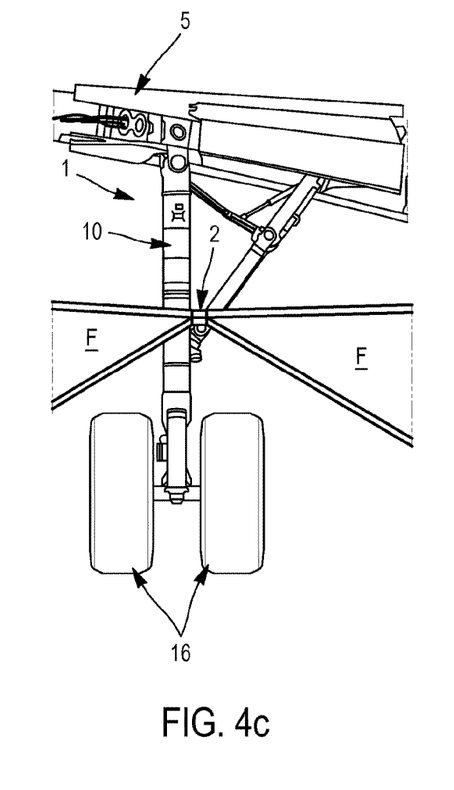

The obstacle detector 2 is preferably selected so as to have an optimal detection field F for a small size, so as to obtain good performance in detection and to allow its accommodation in the box of the landing gear 1 when it is in its retracted configuration.

Preferably, the obstacle detector 2 is selected so as to have a detection field F capable of covering a lower area and a rear area of the aircraft 5. For example, the aperture of the detection field can have a horizontal viewing angle $\alpha$ comprised between 30° and 180°, and a depth comprised between approximately 0 meter and 250 meters. Such a detector 2 is then capable of detecting, in a sufficiently accurate manner, obstacles in the environment of an aircraft 5, even if the aircraft 5 is circulating on the ground at high speed. Moreover, current technology allows obstacle detectors 2 to be produced having such performance with small size.

So as to optimize the detection of obstacles, particularly during backing manoeuvres, the obstacle detector 2 can be oriented toward a rear area of the landing gear 1, i.e. an area of the landing gear 1 intended to face the tailplane of the aircraft 5 when the landing gear 1 is in the deployed position. The position and the orientation of the obstacle detector 2 can in particular be selected according to its detection accuracy and its detection field F, as well as the geometry of the landing gear 1 and of its landing box (available space in the box, kinematics of extension and retraction, etc.).

In one embodiment, the obstacle detector 2 can for example be attached to a lateral portion of the landing gear 1, the detection means of the detector being oriented toward the back thereof. This position of the obstacle detector 2 has the advantage of not hindering the landing gear 1 when the latter is in the retracted configuration in the box, the obstacle detector 2 being positioned in a preexisting unoccupied space of the box. Moreover, this position of the obstacle detector 2 does not hinder the kinematics of retraction or of extension of the landing gear 1.

The obstacle detector 2 can in particular be attached to the internal portion of the landing gear 1, i.e. on the side of the brace-strut 18. In this manner, when the landing gear 1 is in the retracted configuration, the obstacle detector 2 is confined in the box of the landing gear 1, where it is protected from the outside.

By way of comparison, when the obstacle detector is attached to the external portion of the landing gear 1, according to the configuration of the landing gear 1 and of its box, it is possible that the detector 2 is exposed to the external environment of the landing gear 1 box or that it is pressed against the door of the landing gear 1 box.

For example, in the case of a retractable main landing gear of an airplane of the Airbus A320 type, the geometry of the landing gear and of its box are such that it can be advantageous to attach the obstacle detector 2 to the internal portion of the landing gear 1, on the side of its brace-strut, so as to guarantee its protection by the landing gear 1 box in the retracted configuration. Moreover, in the case of the main landing gear of the Airbus A320, it is possible to accommodate one or more detectors having space requirements on the order of 100×120×122 mm.

Figure 5:
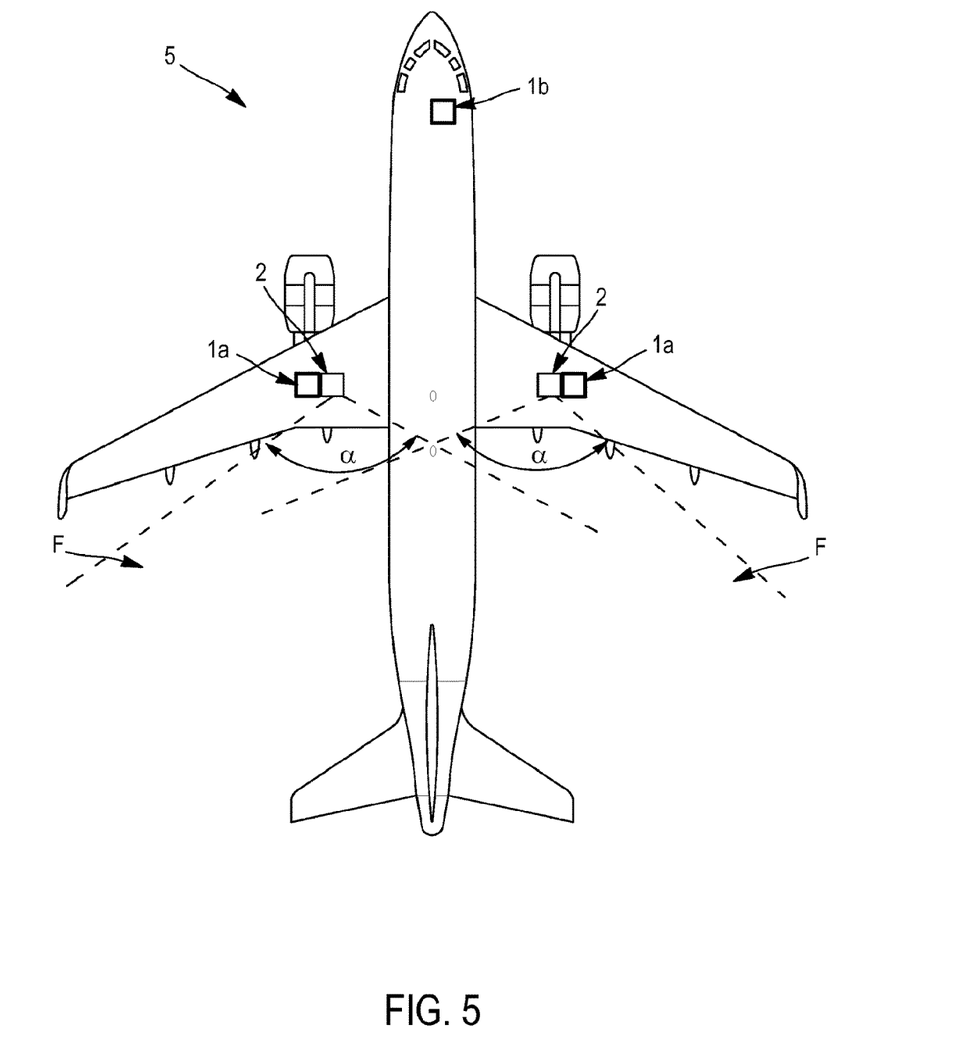
Figure 6:
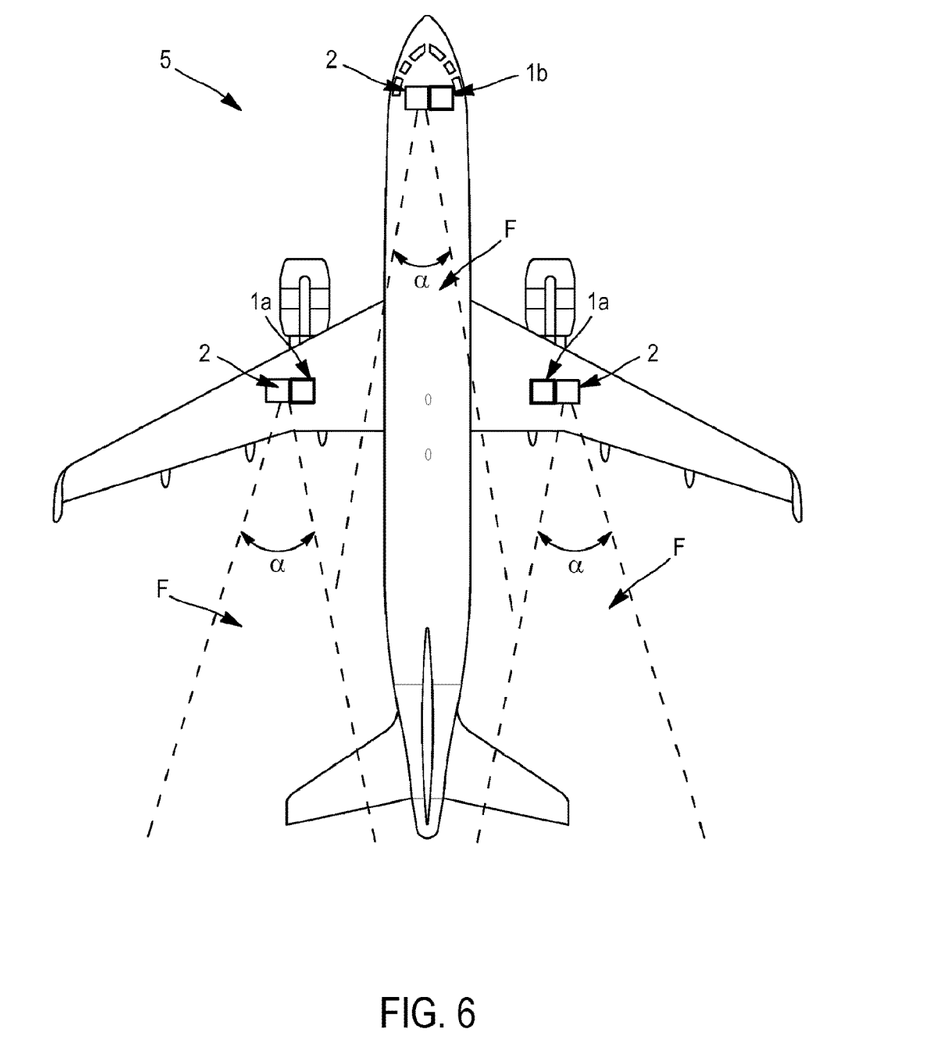

FIGS. 5 and 6 illustrate examples of positioning of obstacle detectors 2 on an example of an aircraft 5 comprising two main landing gears 1a attached to its wings and a nose landing gear 1b attached under the nose of the aircraft. It will be understood that the invention is not limited to this type of aircraft, and can just as well be applied to aircrafts 5 having a different number of landing gears 1. The position and the orientation of the obstacle detectors 2 are then adapted depending on the type of aircraft and the number of landing gears.

In FIG. 5, the obstacle detectors 2 are attached in an internal lateral portion of the main landing gears 1a, i.e. toward the interior of the aircraft 5, and are oriented toward the rear of the aircraft 5. Here the nose landing gear 1b does not comprise an obstacle detector 2. Thanks to this position and to this orientation, not only can the obstacle detectors 2 be accommodated in a free space within the box of their respective landing gear 1a while still respecting the kinematics of the landing gear 1a during its extension or its retraction, but in addition the detection field F of the detectors 2 allows coverage of an important portion of the area extending below the aircraft 5 and behind it. Moreover, this position of the obstacle detectors makes it possible to obtain a considerable overlapping of their respective detection field F in the area subjacent to the aircraft 5.

In FIG. 6, the obstacle detectors 2 are attached in an external lateral portion of the main landing gears 1a, i.e. toward the exterior of the aircraft 5, and are oriented toward the rear of the aircraft 5 so as to cover the rear area and the lateral area of the aircraft 5. Obstacle detectors 2 are also attached to the nose landing gear 1b, here to the lateral portion. As a variant, it will be understood that the obstacle detectors 2 of the nose landing gear 1b could also be oriented toward the front of the aircraft 5. Similarly to the example of FIG. 5, this position and this orientation of the obstacle detectors 2 make it possible to accommodate the detectors in a free space of the box of their respective landing gear while still respecting the kinematics of the landing gear during its extension or its retraction. Moreover, the detection field F of the detectors 2 makes it possible to cover a considerable portion of the area extending below the aircraft 5 and behind it, with a considerable overlapping of the detection fields F of the detectors 2 in the area subjacent to the aircraft 5.

The obstacle detector 2 can be protected from its environment (bad weather, wind, etc.) using a protective shield, for example by a protective cap or by the support 3 of the detector 2.

The landing gear 1 can comprise several obstacle detectors 2, for example two obstacle detectors 2, so as to improve the detection of obstacles, reduce the noise which can be caused by external conditions (particularly by meteorological conditions) and compensate for any possible malfunction of one of the obstacle detectors 2.

For example, the landing gear 1 can comprise at least one, preferably two obstacle detectors 2 selected from the following group: a proximity detector (infrared, microwave, ultrasound, etc.), one or more cameras (infrared or visible—single or stereo artificial vision, etc.), a range finder (ultrasonic, radar or laser range finder), etc.

In one embodiment, the landing gear 1 can comprise an actuator (not visible in the figures) configured to rotate the obstacle detector 2 around the longitudinal axis X of the casing 10. The implementation of such an actuator thus allows the detector to increase the angle α of its detection field F by performing a sweep of the surrounding area. The detector 2 can thus detect obstacles over 360° around the longitudinal axis X of the casing 10, even if the initial range α of the detection field F of the obstacle detector 2 is less than 360°.

The actuator thus allows a reduction in the dimensions of the obstacle detector 2, and therefore its bulk, by reducing the required performance of the detector 2.

It will be understood that, in the case where the obstacle detector 2 is fixed on a support 3, the actuator can position (or orient) the obstacle detector 2 by means of its support 3.

When the landing gear 1 comprises several obstacle detectors 2, at least two obstacle detectors 2 are attached together so as to form a single part. In one embodiment, all of the obstacle detectors 2 are attached together to form a single part.

For example, all or part of the obstacle detectors 2 can be attached to the support 3.

Thus, when the landing gear 1 is equipped with an actuator and the detectors are fixed on a common support 3, the setting in rotation of the support 3 by the actuator around the longitudinal axis X drives the displacement of all the obstacle detectors 2 attached to this support 3.

The invention claimed is:

1. A landing gear for an aircraft comprising:
   a casing, having a main direction extending along a longitudinal axis, said casing comprising a first end configured to be mounted on the aircraft, and a second end opposite to the first end,
   a rod, slidably mounted on the second end of the casing, said rod being movable in translation with respect to the casing along the longitudinal axis,
   at least one obstacle detector attached to the landing gear, wherein the obstacle detector is attached in an area adjacent to the second end of the casing.

2. The landing gear according to claim 1, wherein the obstacle detector is attached to the casing.

3. The landing gear according to claim 1, further comprising a brace-strut, said brace-strut comprising a first end configured to be mounted on the aircraft and a second end configured to be connected to the casing in an area adjacent to the second end of said casing, and wherein the obstacle detector is attached in an area adjacent to the brace-strut.

4. The landing gear according to claim 3, wherein the detector is attached to the casing, between the second end of the brace-strut and the first end of the casing.

5. The landing gear according to claim 1, wherein the obstacle detector is attached so as to be oriented toward a rear area of the landing gear, said rear area being intended to be oriented toward a rear area of an aircraft.

6. The landing gear according to claim 1, wherein the obstacle detector is attached in a lateral area of the landing gear, preferably in the internal portion of the landing gear.

7. The landing gear according to claim 1, comprising at least two obstacle detectors.

8. The landing gear according to claim 7, wherein the obstacle detectors are attached together so as to form a single part.

9. The landing gear according to claim 1, wherein the obstacle detector comprises at least one, preferably at least two obstacle detectors selected from the following group: infrared proximity detector, microwave proximity detector, ultrasonic proximity detector, one or more infrared or visible cameras, an ultrasonic range finder, a radar range finder or a laser range finder.

10. The landing gear according to claim 1, further comprising an actuator configured to rotate the obstacle detector around the longitudinal axis of the casing.

11. The landing gear according to claim 1, further comprising a wiring harness configured to control transmission of power within the landing gear, said wiring harness being attached to the landing gear using elastically deformable attachment rings, and wherein the obstacle detector comprises cables attached to the landing gear using the attachment rings of the wiring harness.

12. The landing gear according to claim 1, wherein the obstacle detector comprises a detection field having an aperture and a depth configured to cover a lower area of the aircraft and a rear area of the aircraft.

13. The landing gear according to claim 12, wherein the aperture of the detection field has a horizontal viewing angle comprised between 0° and 180°, and the depth of the detection field is comprised between approximately 0 meter and 250 meters.

14. The landing gear according to claim 1, comprising a main landing gear or a nose landing gear of the aircraft.

15. The landing gear according to claim 1, wherein it is retractable.

16. An aircraft, comprising a landing gear according to claim 1.

* * * * *